Oct. 21, 1924.

A. H. SWEET 1,512,507

BRAKE BAND

Filed Feb. 8, 1923

Inventor;
Alvin H Sweet,
per M.W. Crandall
Attorney.

Patented Oct. 21, 1924.

1,512,507

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed February 8, 1923. Serial No. 617,772.

To all whom it may concern:

Be it known that I, ALVIN H. SWEET, a citizen of the United States, residing at Los Angeles, in the county of Los Angeles and State of California, have invented a new and useful Brake Band, of which the following is a specification.

My invention relates to brake bands, and particularly when they are housed or relatively inaccessible for relining. The objects of my improvement are, first, to provide a lining that may be removed from, or applied to a brake band without removing it from its normal position; and, second, to afford facilities for slipping the lining into the band circumferentially.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1:
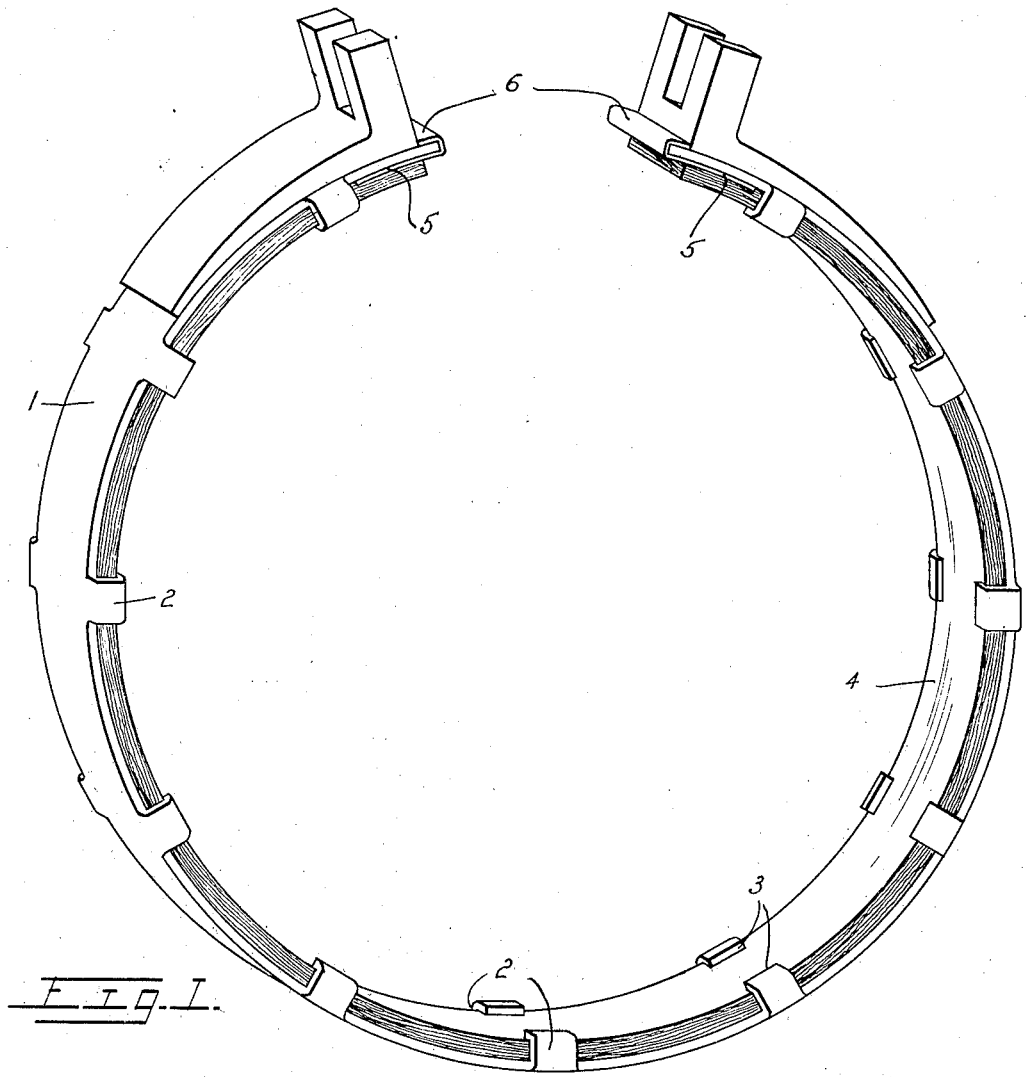
Figure 2:
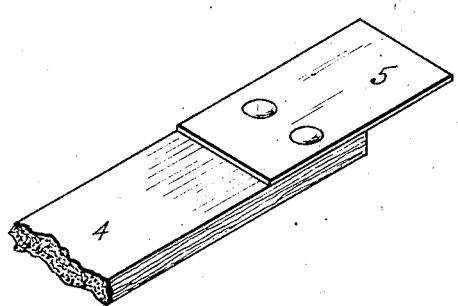
Figure 3:
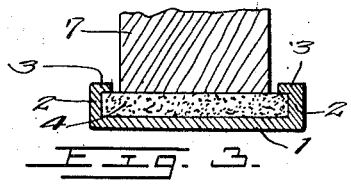

Figure 1 is a perspective view of my improved brake band; Figure 2 is a similar view of an end fragment of the lining; and Figure 3 is a cross section of the brake band and lining in co-operative relation to the brake drum.

Similar numerals refer to similar parts throughout both views.

The strap 1 is made with inwardly turned integral lugs 2, the ends of the latter being flanged, as at 3, for retaining the lining 4 within the strap. The brake drum 7 must therefore run between these opposed flanges which serve to keep the band in alignment upon the drum.

The lining, after it is cut to approximately the proper length, has metal strips 5 riveted to each end. The lining is installed by slipping it into the strap circumferentially, in such a manner that it will be retained by the flanges on lugs 2, and then bending the metal ends 5 around the ends of the strap as shown at 6 in Fig. 1.

The construction and operation of the invention will be clear from the foregoing description. It will also be obvious that the device is relatively inexpensive, and affords means for relining with a minimum of expense and trouble.

Certain features of this invention are shown in a previous application filed by me on July 27, 1922, Serial Number 577,935, which has matured into Patent Number 1,460,118, June 26, 1923, and in companion applications filed coincidently with this. None of these applications however claims what is claimed herein.

I claim:

1. A brake band having at each side inwardly extending lugs with internal lateral flanges at the inner ends thereof, whereby a lining may be positioned and retained within said band.

2. A brake band having spaced lugs extending inwardly from the edges thereof and a removable lining within said band; said lugs being adapted by means of terminal flanges for axially and radially positioning and retaining said lining within said band.

3. A brake band having spaced lugs extending inwardly from the edges thereof and a removable lining; said lugs being adapted for maintaining the lining in fixed axial and radial relation to said band; and said lining having means attached thereto for maintaining it in fixed angular relation to said band.

4. A brake band having spaced lugs extending inwardly from the edges thereof and a removable lining; said lugs being adapted for maintaining the lining in fixed axial and radial relation to said band; and said lining having clips at the ends thereof adapted for being bent over the ends of said band for maintaining fixed angular relation between said lining and said band.

ALVIN H. SWEET.